Figure 1:
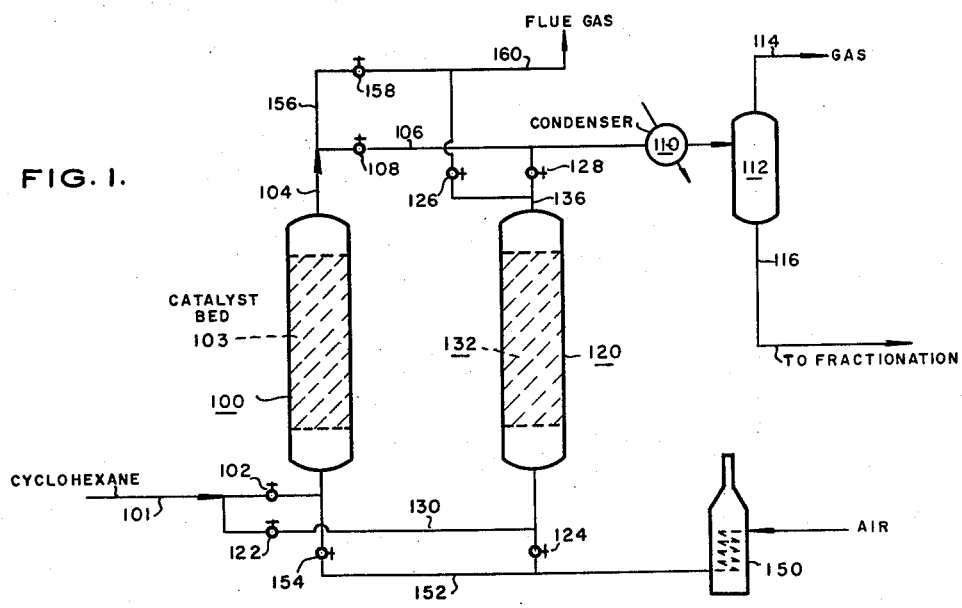

June 29, 1965 S. H. HASTINGS ETAL 3,192,278
METHOD OF METHYLATING AND AROMATIZING CYCLOHEXENES
Filed Sept. 19, 1962

INVENTORS.
SAM H. HASTINGS,
PRENTISS S. VILES,
BY Sylvester W. Brock, Jr.
ATTORNEY.

3,192,278
METHOD OF METHYLATING AND AROMATIZING CYCLOHEXENES
Sam H. Hastings and Prentiss S. Viles, Baytown, Tex., assignors, by mesne assignments, to Esso Research and Engineering Company, Elizabeth, N.J., a corporation of Delaware
Filed Sept. 19, 1962, Ser. No. 224,759
11 Claims. (Cl. 260—668)

The present invention is directed to a process for the conversion of cyclic olefinic hydrocarbons. More particularly, it is directed toward the conversion of cyclic olefinic hydrocarbons into aromatic hydrocarbons having one or more carbon atoms in addition to the carbon atoms present in the parent olefinic molecule. In its more specific aspects, the invention is concerned with a vapor-phase process which comprises methylation of a cyclohexene concurrently with dehydrogenation-aromatization to produce an aromatic hydrocarbon having no oxygenated characteristics.

The present invention may be described as a method for converting substituted and unsubstituted cyclohexenes into aromatic hydrocarbons having more carbon atoms than the parent cycloolefin. The conversion is accomplished generally by contacting a cyclohexene, unsubstituted or alkyl-substituted, with a synthesis gas in the presence of a zinc oxide catalyst, within broad temperature and pressure ranges. By the practice of the present invention, oxygenated product compounds are avoided.

Suitable feed stocks for the present invention comprise cyclohexene, substituted or unsubstituted, and streams containing the substituted and unsubstituted cyclohexenes. For the purposes of this application, the term "a cyclohexene" or "cyclohexenes" shall refer to alkyl-substituted cyclohexenes as well as cyclohexene itself. The alkyl substitution can be on the olefinic carbons as well as the other carbon atoms in the cyclohexene molecule. For example, cyclohexene, methyl cyclohexene, dimethyl cyclohexene, trimethyl cyclohexene, ethyl cyclohexene, diethyl cyclohexene, etc., are suitable as feed materials for the present process. The substituent alkyl groups do not enter into the reaction, and are carried through unreacted. Cyclohexene will yield toluene as an end product, whereas methyl cyclohexene will yield the xylenes as products, etc.

The catalyst for the present invention is zinc oxide, and it is critical that the zinc oxide catalyst be used. This zinc oxide catalyst may be used with or without a support, but if a support is used, it is preferred that 40% zinc oxide on 60 weight percent gamma alumina be employed. Other support materials such as kieselguhr may be used. Use of catalysts such as cobalt moylbdate, thorium oxide, etc., results in the oxygenation of the feed compound so that the reaction effluent contains oxygenated compounds. This is undesirable in the methylation-aromatization reaction since it represents a reduction in efficiency and a loss of product. Therefore, catalysts other than zinc oxide are not suitable in the present process.

The present invention may be carried out either in a fixed bed or by the fluidized bed technique, and, therefore, the size and nature of the catalyst particles would depend upon the type of contacting which is desired. In general, the particle size of the catalyst is not critical insofar as selectivity and operability in the process are concerned.

The reaction of the present invention may be carried out over a broad temperature range, for example, between 700° F. and 1000° F., with a preferred range of 800° F. to 900° F. It has been found that no thermal cracking occurs at 850° F. and 500 p.s.i.g. pressure, and good selectivity to methylation-aromatization is obtained.

The pressure of the concurrent methylation-aromatization reaction may be between one atmosphere to 100 atmospheres. Higher pressures favor the methylation reaction and are preferred, such as 30 to 35 atmospheres.

Space velocity based on the liquid charge rate of the feed material and upon the catalyst is not critical, and may run as high as a practical maximum of 10 v./v./hr. The mimimum practical lower limit is about 0.1 v./v./hr.

The synthesis gas which is utilized as a coreactant in the present invention comprises hydrogen and carbon monoxide in a mol ratio of $H_2/CO$ from about 1:1 up to about 9:1. The preferred $H_2/CO$ ratio is about 2:1. The amount of synthesis gas to be used is determined by the ratio of carbon monoxide in the synthesis gas to the feed stock, it being necessary to employ at least one mol of carbon monoxide per mol of feed stock. It should be noted that hydrogen being released in the dehydrogenation-aromatization reaction provides a suitable excess of hydrogen for the methylation reaction.

The chemical reaction in gross may be best illustrated by taking cyclohexene and methyl cyclohexene as examples and setting forth in formula the reaction as it takes place. Thus, in reaction (1) below, the cyclohexene, is methylated and dehydrogenated to produce toluene, whereas methyl cyclohexene in reaction (2) is shown to produce the xylenes. The reaction is believed to proceed in two steps as shown by reactions (1a) and (1b). Note that there is no net consumption of hydrogen since the aromatization reaction provides sufficient hydrogen for methylation.

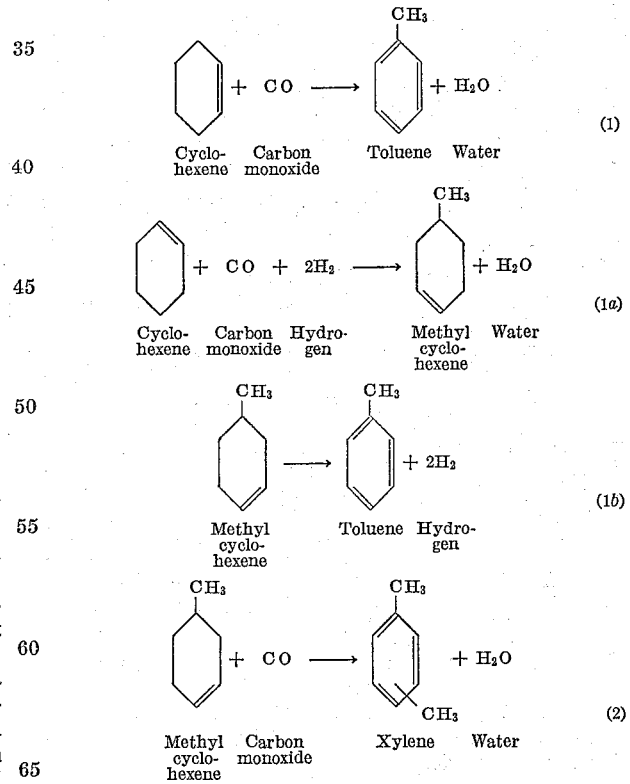

Figure 2:
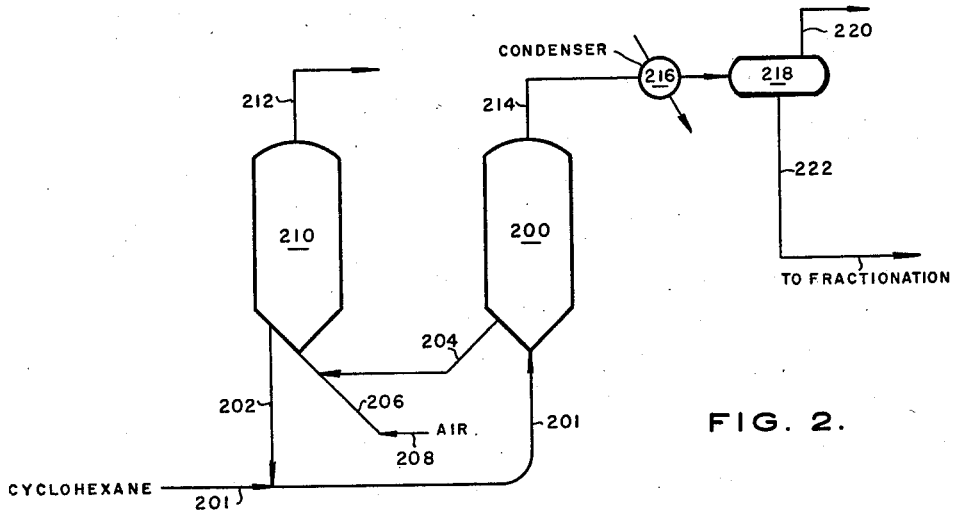

By advertence to the drawing, the practice of the present process may be better understood, particularly with reference to:

FIG. 1 wherein is shown the practice of the present invention in using fixed bed reactors for sequential operation, and FIG. 2 wherein is shown the practice of the present invention when utilizing a fluidized bed technique.

Referring now to FIG. 1, the cyclohexene feed is introduced into a reactor 100 by way of line 101 controlled by way of valve 102. The cyclohexene may have been previously heated to the reaction temperature by a furnace (not shown). The cyclohexene is passed in contact with a bed 103 of a zinc oxide catalyst, suitably 40% zinc oxide on 60% gamma alumina. The concurrent methylation-aromatization reaction takes place within the reactor 100, and the effluent reaction products are removed by way of line 104. The effluent is removed by way of product line 106 controlled by valve 108 and is passed through a condenser 110 into a receiver drum 112, wherein the gaseous material is allowed to separate from the liquid material, and is withdrawn by way of line 114. The liquid product withdrawn by way of line 116 is passed to fractionation facilities for separation of the products. The reactor 120, in parallel with reactor 100, is utilized after the reactivation of the catalyst within the reactor 100 by closing the valve 102 and opening valve 122, closing valve 124 and valve 126, and opening valve 128. The cyclohexene then flows by way of line 101, valve 122, line 130 and reactor 120 into contact with the zinc oxide catalyst bed 132 within the reactor 120. The catalyst bed 132 within reactor 120 is suitably identical in characteristics and quantity to that within the reactor 100. The effluent stream then passes from the reactor 120 by way of line 136, valve 128, and line 106 through the condenser 110 and separator drum 112, as in the case of the effluent from reactor 100. Concurrently with the use of reactor 120, the deactivated catalyst in the reactor 100 may be regenerated by passing air which has been heated in furnace 150 through line 152 and valve 154 upwardly through the bed of zinc oxide catalyst in the reactor 100, and is passed by way of lines 104 and 156, valve 108 being closed and valve 158 being open, into the flue gas exit line 160. Thus, it is seen that the concurrent methylation-aromatization process of the present invention may be carried out expeditiously in a fixed bed reactor. It should be pointed out, however, that the catalyst may be simply discarded, although for economic reasons this is not desirable. The regeneration process forms no part of the present invention.

By reference to FIG. 2, the practice of the present invention is illustrated when utilizing a fluidized bed technique. The cyclohexene feed stock is introduced by way of line 201 into a reactor 200. The cyclohexene is admixed with hot catalyst which is dropped by way of line 202 into the line 201 and is carried upwardly into reactor 200 for reaction therewithin. The catalyst is separated out in the reactor 200 and is passed by way of line 204 into a regenerator feed line 206 where it is contacted with air introduced as at 208. The air and catalyst mixture is brought into the regenerator 210 where the regeneration takes place and the zinc oxide is raised in temperature to a high degree. Flue gases are withdrawn from the regenerator 210 by way of line 212.

The reaction products are withdrawn from reactor 200 by way of line 214, condenser 216, and receiver drum 218 for separation into a gaseous stream 220 and a liquid product stream 222, which is removed to the fractionation facilities for separation into the various components.

Thus, by advertence to the process as illustrated in the drawings, it is seen that continuous operation may be had under suitable steady-state conditions either in a fixed bed catalyst system or in a fluidized bed system.

In order to illustrate the present invention, the following run was made.

EXAMPLE 1

Cyclohexene was contacted with a 40 weight percent zinc oxide on 60 weight percent gamma alumina catalyst at a flow rate of 0.25 volume of liquid for each volume of catalyst per hour at a temperature of 850° F. and a pressure of 500 p.s.i.g., in the presence of a synthesis gas composed of 67 volume percent hydrogen and 33 volume percent carbon monoxide. The ratio of synthesis gas per mol of cyclohexene was about 3:1. The reaction was carried out under steady-state conditions for 8 hours, and was sampled to give a product as shown in Table I below.

EXAMPLE 2

In order to establish the effects of catalyst deactivation, the experimental run set forth in Example 1 was continued for an additional 8-hour period, and a product at the end of 16 hours was taken as a sample for analysis. The analysis of this product also is given below in Table I.

*Table I*

| Mass Spec. Data | Feed | 8-Hour Product | 16-Hour Product |
|---|---|---|---|
| Benzene, Vol. Percent | | 1.7 | 14.5 |
| Toluene, Vol. Percent | | 11.6 | 5.8 |
| $C_8$ Aromatics, Vol. Percent | | 0.7 | 0.8 |
| $C_9$ Aromatics, Vol. Percent | | 0.4 | 0.3 |
| $C_{10}$ Aromatics, Vol. Percent | | 0.4 | 0.2 |
| $C_{11}$ Aromatics, Vol. Percent | | 1.0 | |
| Indan, Vol. Percent | | 3.0 | |
| Total Saturates, Vol. Percent | | 8.4 | 16.6 |
| Cyclic Olefins: | | | |
| $C_6$ Vol. Percent | 99+ | 41.5 | 54.4 |
| $C_7$ Vol. Percent | | 28.1 | 6.4 |
| $C_8$ Vol. Percent | | 3.2 | 0.6 |

From the above data in Table I, it is seen that the feed stock, which comprised 99% cyclohexene, was methylated to produce 11.6% toluene and 5.5% $C_8$ through $C_{11}$ aromatics and Indan. Some 28.1% was converted into $C_7$ cyclic olefins, while 3.2% was converted to $C_8$ olefins. Methylation prior to aromatization is indicated. No oxygenated compounds were found in the product stream at the end of 8 hours.

By reference to the data at the end of 16 hours, it is seen that the selectivity for methylation was very low, only 50% of that shown at 8 hours. The dehydrogenation-aromatization activity, however, was apparently increased since the yield of benzene was 14.5% as opposed to 1.7% at 8 hours. Note also that 54.4% of the cyclohexene feed stock remained unreacted, as compared with 41.5% at the end of 8 hours. Thus, the selectivity and activity of the zinc oxide catalyst was seen to decline with use. However, even at 16 hours, substantially no oxygenated compounds were seen in the product.

Applicants having described in detail the essence of their invention, and having set forth their preferred mode of carrying it out, the scope of the present invention should be determined not by the specific examples given, but rather by the scope of the appended claims.

We claim:

1. A method of methylating and aromatizing which comprises reacting a cyclohexene with a synthesis gas in the presence of a zinc oxide catalyst, said synthesis gas comprising hydrogen and carbon monoxide in a mol ratio from about 1:1 to about 9:1, whereby an aromatic compound having at least one carbon atom in excess of that possessed by the cyclohexene feed stock is obtained.

2. A method in accordance with claim 1 wherein the mol ratio of carbon monoxide in the synthesis gas to the cyclohexene feed is at least 1:1.

3. A method in accordance with claim 1 wherein the reaction is carried out at a temperature within the range from about 700° F. to about 1000° F. and a pressure within the range from about 1 to about 100 atmospheres.

4. A method in accordance with claim 1 wherein the catalyst is 40% zinc oxide on 60% gamma alumina.

5. A method in accordance with claim 1 wherein the feed is cyclohexene.

6. A method of concurrently methylating and aromatizing a cyclohexene feed stock which comprises reacting a cyclohexene feed with a synthesis gas in the presence of a zinc oxide catalyst, said synthesis gas comprising hydrogen and carbon monoxide in a mol ratio from about 1:1 to about 9:1 and a mol ratio of carbon monoxide in the synthesis gas to the cyclohexene feed is at least 1:1, whereby the cyclohexene feed is methylated and aromatized to produce a substantially oxygenated compound-free product.

7. A method in accordance with claim 6 wherein the reaction temperature is within the range from about 700° F. to about 1000° F. and a reaction pressure is maintained within the range from about 1 to about 100 atmospheres.

8. A method in accordance with claim 6 wherein the catalyst is 40% zinc oxide on 60% gamma alumina.

9. A method of concurrently methylating and aromatizing a cyclohexene feed which comprises reacting the cyclohexene feed with a synthesis gas in the presence of a 40% zinc oxide on 60% gamma alumina catalyst at a temperature within the range from about 700° F. to about 1000° F. and a pressure within the range from about 1 to about 100 atmospheres, said synthesis gas comprising hydrogen and carbon monoxide in a mol ratio from about 1:1 to about 9:1, and the ratio of carbon monoxide in the synthesis gas to the cyclohexene feed being at least 1:1, whereby the cyclohexene feed is methylated and aromatized in the substantial absence of oxygenated products.

10. A method in accordance with claim 9 wherein the temperature is within the range from about 800° F. to about 900° F. and the pressure is within the range from about 30 to about 35 atmospheres.

11. A method in accordance with claim 9 wherein the feed is cyclohexene, the temperature is about 850° F., and the pressure is about 500 p.s.i.g.

References Cited by the Examiner

UNITED STATES PATENTS

| | | | |
|---|---|---|---|
| 2,486,243 | 10/49 | Atwell | 260—668 |
| 2,498,709 | 2/50 | Roberts et al. | 260—668 |
| 2,500,482 | 3/50 | Barter | 260—668 |
| 2,742,515 | 4/56 | Stuart | 260—668 |
| 2,917,532 | 12/59 | Watkins | 208—107 |

ALPHONSO D. SULLIVAN, *Primary Examiner.*